United States Patent [19]

Udipi

[11] Patent Number: 4,985,501
[45] Date of Patent: Jan. 15, 1991

[54] POLYBLENDS OF THERMOPLASTIC COPOLYESTERS AND STYRENIC/UNSATURATED DICARBOXYLIC ACID ANHYDRIDE COPOLYMERS

[75] Inventor: Kishore Udipi, Longmeadow, Mass.

[73] Assignee: Monsanto Company, St. Louis, Mo.

[21] Appl. No.: 453,850

[22] Filed: Dec. 20, 1989

[51] Int. Cl.$^5$ ............................................. C08L 67/02
[52] U.S. Cl. ..................................... 525/173; 525/176
[58] Field of Search ................................ 525/173, 176

[56] References Cited

U.S. PATENT DOCUMENTS 3,564,077  2/1971  Brinkmann et al. .
3,578,730  5/1971  Herwig et al. .
4,148,956  4/1979  Breitenfeller et al. .
4,305,869  12/1981 Lee .
4,397,986  8/1983  Hornbaker .
4,582,876  4/1986  Weemes .............................. 525/64

FOREIGN PATENT DOCUMENTS 0269027  6/1988  European Pat. Off. .

*Primary Examiner*—Patricia Short

[57] ABSTRACT

A molding composition prepared from a blend of: (a) a copolyester of a dicarboxylic acid moiety, such as terephthalic acid or dimethyl terephthalate, and a dihydric alcohol moiety, such as ethylene glycol in combination with diethylene glycol or 1,4-cyclohexanedimethanol and (b) a copolymer prepared from a styrenic monomer, an unsaturated dicarboxylic acid anhydride, and optionally an alkyl (meth)acrylic ester wherein the alkyl group contains 1 to 3 carbon atoms, wherein articles molded from such compositions have improved clarity and toughness.

14 Claims, No Drawings

POLYBLENDS OF THERMOPLASTIC COPOLYESTERS AND STYRENIC/UNSATURATED DICARBOXYLIC ACID ANHYDRIDE COPOLYMERS

BACKGROUND OF THE INVENTION

This invention relates to thermoplastic molding compositions comprised of thermoplastic copolyesters and styrenic/unsaturated dicarboxylic acid anhydride copolymers. More specifically, it relates to the blending of a copolyester with a styrenic/maleic anhydride copolymer (SMA) resulting in a product with good toughness and good clarity.

Thermoplastic polyesters, for example, polyethylene terephthalate (PET) and polybutylene terephthalate (PBT) are molding compositions from which articles with valuable mechanical properties can be produced. However, they have high deformation tendencies at elevated temperatures, low heat distortion temperatures (HDT), and moderate impact strength and toughness. When modifying agents consisting of polymers or copolymers including, for example, an acrylonitrile-acrylatestyrenic copolymer is added, the resulting product displays better dimensional stability, increased HDT's, good impact strength and toughness.

Yet for applications such as refrigerator crisper pans, business machines, covers for personal-computer (PC) printers and the like, additional toughness is required along with increased clarity.

Accordingly, it is a primary object of the present invention to provide a unique blend of copolyester and a styrenic/unsaturated dicarboxylic acid anhydride copolymer that produces a product exhibiting toughness and clarity.

DESCRIPTION OF THE PRIOR ART

PETG, the copolyester used in the present invention, is well known in the art and is described in U.S. Pat. No. 4,381,356. It is a copolyester of a dicarboxylic acid moiety, at least 50 mole percent of which is terephthalic acid or dimethyl terephthalate and a dihydric alcohol moiety, at least 50 mole percent of which is ethylene glycol and 20 to 50 mole percent of which is diethylene glycol or 1,4-cyclohexanedimethanol, the copolyester having a glass transition temperature (Tg) in the range of 40° to 85° C. and an inherent viscosity (I.V.) in the range of 0.2 to 10. The viscosity is determined at 25° C. using 0.5 grams of polymer per 100 ml. of a solvent composed of 60% phenol and 40% tetrachloroethane.

The copolymers of a styrenic monomer and an unsaturated dicarboxylic acid anhydride are also well known in the art. The styrenic monomer may be styrene itself, styrene derivatives such as alphamethylstyrene, p-tert-butyl styrene, chlorostyrene, 2,4-dichlorostyrene and 2-chloro-4-methylstyrene, or mixtures of styrene and its derivatives. The unsaturated dicarboxylic acid anhydride can be maleic anhydride or any of the homologues of maleic anhydride such as itaconic, citraconic and aconitic anhydrides.

Preferred compositions are copolymers of a styrenic monomer, an unsaturated dicarboxylic acid anhydride and an alkyl (meth)acrylic ester such as a copolymer of styrene, maleic anhydride and an alkyl (meth)acrylic ester. The alkyl (meth)acrylic ester can be methyl methacrylate, ethyl methacrylate or propyl methacrylate. The copolymer will usually be comprised of from 45 to 83% (preferably from 50 or 60 to 75%) by weight of a styrenic monomer, from 35 to 15% (preferably 30 to 20%) by Weight of an unsaturated dicarboxylic acid anhydride, and from 20 to 2% (preferably 10 to 2%) by weight of a $C_1$ to $C_3$ alkyl (meth)acrylic ester.

Especially preferred are copolymers of styrene, maleic anhydride and methyl methacrylate (SMAMMA). These are well known in the art and are described in U.S. Pat. No. 4,305,869.

PETG has been blended with a variety of polymers including styrene-butadiene rubber (U.S. Pat. No. 3,564,077); polymethylbutene (U.S. Pat. No. 3,578,730); a modified styrene/acrylonitrile copolymer (U.S. Pat. No. 4,148,956); poly(styrene/ acrylate) and poly(styrene/acrylonitrile/acrylate) (U.S. Pat. No. 4,397,986).

SUMMARY OF THE INVENTION

The present invention is directed to a polyblend comprising:

A. 95 to 70% by weight of a copolyester of a dicarboxylic acid moiety, at least 50 mole percent of which is terephthalic acid, and a dihydric alcohol moiety, at least 50 mole percent of which is ethylene glycol and 20 to 50 mole percent of which is diethylene glycol or 1,4-cyclohexanedimethanol, and B. 5 to 30% by weight of a copolymer prepared from a styrenic monomer and an unsaturated dicarboxylic acid anhydride, and optionally up to 20% by weight of an alkyl (meth)acrylic ester wherein the alkyl group contains 1 to 3 carbon atoms, wherein the total amount of A and B is 100% by weight.

DESCRIPTION OF THE PREFERRED EMBODIMENTS

These polyblends are useful in a wide variety of applications including crisper pans for refrigerators, business machines, covers for PC printers, and various medical applications which require toughness and clarity.

The inventive composition generally will have a preferred Inverted Dart Impact (IDI) of greater than 50.0 Joules (J). In addition, the inventive composition generally will have a preferred % light transmittance measurement of greater than 80.00, and a Minimum Molding Pressure (MMP) of less than 6.4 megapascals (MPa).

In general, the molding composition contains 95 to 70% by weight of the copolyester (hereinafter referred to as PETG) and 5 to 30% by weight of the styrenic copolymer (hereinafter referred to as SMA) based on the total weight of PETG and SMA.

The PETG used is a copolyester of a dicarboxylic acid moiety, at least 50 mole percent of which is terephthalic acid and a dihydric alcohol moiety, at least 50 mole percent of which is ethylene glycol and 20 to 50 mole percent of which is diethylene glycol or 1,4-cyclohexanedimethanol. The PETG has a glass transition temperature (Tg) in the range of 40° to 85° C. and an inherent viscosity (I.V.) in the range of 0.2 to 10. The viscosity is determined at 25° C. using 0.5 grams of polymer per 100 ml of a solvent composed of 60% phenol and 40% tetrachloroethane. The preferred PETG is purchased from Eastman Chemical Products, Inc. under the product name Kodar PETG Copolyester 6763 or Ektar GN 001.

The preferred SMA contains 60 to 80% by weight of styrene and 40 to 20% by weight of maleic anhydride.

The preferred SMAMMA contains 55 to 83% by weight of styrene, 35 to 15% by weight of maleic anhydride and 10 to 2% by weight of methyl methacrylate. Other known derivatives of styrene, such as alpha-methylstyrene, may be used to replace the styrene monomer; other unsaturated dicarboxylic acid anhydrides may be used to replace the maleic anhydride monomer; and other alkyl (meth)acrylic esters may be used to replace the methyl methacrylate monomer provided that the requirements of processability, toughness and clarity are met in the final blend. Mixtures of styrenic monomers can also be employed if desired, provided again that the desired toughness, clarity and processability is obtained in the final blend.

In addition to the above components, the polyblends of the invention can advantageously contain other additives such as plasticizers, lubricants, antioxidants, stabilizers, flameretardants, fibers, mineral fibers, dyes, pigments and the like. However, some such additives may have an adverse effect on clarity and toughness.

The preparation of the inventive molding composition was performed utilizing the compounding method where the PETG and SMAMMA in the form of pellets are blended, then compounded in a Leistritz twin-screw-extruder and then conveyed to the molding machine where test specimens are produced.

In the working examples set forth below the following components are used:

PETG - a copolyester of a dicarboxylic acid moiety, at least 50 mole percent of which is terephthalic acid, and a dihydric alcohol moiety, at least 50 mole percent of which is ethylene glycol and 20 to 50 mole percent of which is 1,4-cyclohexanedimethanol and purchased from Eastman Chemical Products, Inc. under the product name Kodar PETG Copolyester 6763 or Ektar GN 001.

SMAMMA - a copolymer of 68% by weight based on the weight of the copolymer of styrene; 25% by weight based on the weight of the copolymer of maleic anhydride; and 7% by weight based on the weight of the copolymer of methyl methacrylate.

SAN - styrene/acrylonitrile copolymer sold by Monsanto Company under the name Lustran®SAN 31.

SANMMA - styrene/acrylonitrile/methyl methacrylate copolymer containing 40/20/40% by weight of S/AN/MMA.

PAMS - polyalpha-methylstyrene from Scientific Polymer Products, Inc. (catalog #399), M.W. =26,500.

LURAN S - 20% polybutylacrylate rubber and 80% 70/30 alpha-methylstyrene/ acrylonitrile copolymer.

In the examples below, the polymeric components in pellet form are dry blended and compounded in a Leistritz twin-screw-extruder with vacuum venting under the following conditions:

| Temperature (zone 1-10): | 260° C. |
| Screw Speed: | 250 rpm |
| In- and Out-put rate: | 13.6 to 15.9 kg/hr (range) |
| Amperage: | 21 to 24 amps. |

The extruded materials were pelletized and then vacuum dried overnight at 68° C. The dried pellets were molded in an Engel Molding Machine (model no. ES80) under the following conditions:

| Mold Temperature: | 20 to 24° C. | | | |
|---|---|---|---|---|
| Zone Temperatures: | 1(nozzle) | 2 | 3 | 4 |
| | 243° | 243° | 243° | 238° C. |
| Screw Speed: | 100 rpm | | | |
| Back Pressure: | 0.7 MPa | | | |
| Post Pressure: | Minimum Molding Pressure MPa | | | |
| Injection Pressure: | Minimum Molding Pressure + 2.07 MPa | | | |
| Injection Speed: | 5.0 to 10 cm/sec (varied to adjust injection time to the target) | | | |
| Injection Time: | 2.5 sec. | | | |

The freshly molded specimens were sealed in a foil bag to prevent moisture absorption prior to testing.

TEST METHODS

The molded specimens were subjected to the following tests:

Minimum Molding Pressure (MMP)

The MMP is the hydraulic pressure required to fill about 90% of the molding cavity of an Engel Molding Machine (model no. ES80) per unit time under the conditions set forth in the section "Sample Preparation". The injection pressure is the MMP plus 2.07 MPa to completely fill the mold.

Multiaxial Inverted Dart Impact (IDI)

The IDI determination utilized represents a modification of the test as described in Society of Plastics Engineers National Technical Conference "Plastics in Surface Transportation" Nov. 12-14, 1974, Detroit, Michigan, at page 238. In the modified test, instead of the dart being attached to the slider and striking the sample, the sample holder is attached to the slider and strikes the instrumented dart. The rotary potentiometer is not used. The instrumented dart used is 1.27 cm in diameter, and the sample strikes the instrumented dart at a velocity of 140.2 m/min. The samples are injection molded into 7.62 cm × 10.16 cm × 0.254 cm and then are cut into 3.81 cm × 5.08 cm × 0.254 cm pieces for testing. Results are given in Joules (J).

Transparency (Total Transmittance, %)

Total transmittance, the amount of radiant energy transmitted by the sample under analysis, was measured by a Hunter Ultra Scan Spectrometer using the illuminant A (indoor light).

EXAMPLES 1 TO 7

In these examples molded specimens containing various amounts of PETG and SMAMMA are tested for processability as determined by the Minimum Molding Pressure (MMP), toughness as determined by the IDI test and clarity as determined by % light transmittance. The results are tabulated in Table I.

TABLE I

SUMMARY OF EXAMPLES 1 TO 7

| Example | % PETG | % SMAMMA | MMP,MPa | IDI,JOULES | TRANSMITTANCE,% |
|---|---|---|---|---|---|
| 1. PETG Control | 100 | 0 | 7.2 | 89.3 | 86.26 |
| 2. | 95 | 5 | 5.8 | 73.0 | 84.00 |
| 3. | 90 | 10 | 5.8 | 73.0 | 83.90 |
| 4. | 80 | 20 | 5.8 | 73.9 | 84.40 |
| 5. | 75 | 25 | 6.2 | 74.1 | 83.90 |
| 6. | 70 | 30 | 6.3 | 71.0 | 83.80 |
| 7. | 60 | 40 | 6.3 | 3.7 | 83.80 |

A review of the MMP, IDI, and % Transmittance values in Table I indicates that compositions containing 95 to 70% by weight of PETG exhibit the desired balance of processability, toughness and clarity. There is a sharp drop in toughness when the level of PETG goes from 70 to 60% by weight.

Table I shows the MMP drops from 7.2 to 5.8 when only 5% by weight of SMAMMA is added. The MMP then increases slightly with the increasing % SMAMMA. The IDI generally decreases with the increasing of % SMAMMA. The IDI of PETG/-SMAMMA 60/40 drops to a very low value possibly due to the SMAMMA phase dominating at this composition resulting in brittle materials. Table I shows the transmittance generally constant within the preferred range of % PETG.

EXAMPLES 8 TO 11

These examples, which are included here for comparison purposes, illustrate compositions which do not exhibit the balance of processability, toughness and clarity obtained with the compositions of the present invention. The molded specimens were prepared by dry blending the pellets which were dried overnight under vacuum at 68° C. The dried pellets were then molded and the molded specimens were handled as in Examples 1 to 7 above. The compositions and their properties are set forth in Table II.

TABLE II

SUMMARY OF EXAMPLES 8 TO 11

| Example | % PETG | % SAN | % SANMMA | % PAMS | % LURAN S | MMP,MPa | IDI,JOULES | TRANSMITTANCE,% |
|---|---|---|---|---|---|---|---|---|
| 8 | 75 | 0 | 25 | 0 | 0 | 6.4 | 79.0 | 12.3 |
| 9 | 75 | 10 | 0 | 15 | 0 | 4.8 | 1.0 | 21.7 |
| 10 | 75 | 15 | 0 | 10 | 0 | 5.1 | 71.6 | 32.3 |
| 11 | 75 | 0 | 0 | 0 | 25 | 4.4 | 71.6 | 11.4 |

Example 8 shows a decrease in transmittance when SANMMA is used in place of SMAMMA. Examples 9 and 10 also show a decrease in transmittance when the SMAMMA is replaced by a mixture of SAN and PAMS. Example 9 further demonstrates that when PAMS is present at the percentage shown, the IDI drops dramatically. Example 11 shows a decrease in transmittance when the SMAMMA portion is replaced by Luran S.

Having thus described the invention, what is claimed is:

1. A thermoplastic molding composition comprising:
   (a) from 95 to 70% by weight based on the total weight of (a) and (b) of a copolyester of a dicarboxylic acid moiety, at least 50 mole percent of which is terephthalic acid, and a dihydric alcohol moiety, at least 50 mole percent of which is ethylene glycol, and from 20 to 50 mole percent of which is diethylene glycol of 1,4-cyclohexanedimethanol, the copolyester having a glass transition temperature (Tg) of about 40° to 85° C. and an inherent viscosity (I.V.) of about 0.2 to 10; and
   (b) from 5 to 30% by weight based on the total weight of (a) and (b) of a copolymer prepared utilizing 45 to 83% by weight based on the weight of the copolymer of a styrenic monomer 55 17% by weight based on the weight of the copolymer of an unsaturated dicarboxylic acid anhydride; and optionally from 0 to 20% by weight based on the weight of the copolymer of an alkyl (meth)acrylic ester wherein the alkyl group contains 1 to 3 carbon atoms;
   wherein the T Transmittance of the molding composition is 80.00 minimum.

2. The molding composition of claim 1 wherein the IDI is 50.0 Joules minimum and the MMP is 6.4 MPa maximum.

3. The molding composition of claim 1 wherein the styrenic monomer is styrene.

4. The molding composition of claim 1 wherein the unsaturated dicarboxylic acid anhydride is maleic anhydride.

5. The molding composition of claim 1 wherein the alkyl acrylic ester is methyl methacrylate.

6. Molded articles prepared from a thermoplastic molding composition comprising:
   (a) from 95 to 70% by weight based on the total weight of (a) and (b) of a copolyester of a dicarboxylic acid moiety, at least 50 mole percent of which is terephthalic acid, and a dihydric alcohol moiety, at least 50 mole percent of which is ethylene glycol and 20 to 50 mole percent of which is diethylene glycol or 1,4-cyclohexanedimethanol, the copolyester having a glass transition temperature (Tg) of about 40° to 85° C. and an inherent viscosity of about 0.2 to 10; and
   (b) from 5 to 30% by weight based on the total weight of (a) and (b) of a copolymer prepared utilizing 45 to 83% by weight based on the weight of the copolymer of a styrenic monomer; 55 to 17% by weight based on the weight of the copolymer of an unsaturated dicarboxylic acid anhydride; and optionally from 0 to 20% by weight based on the weight of the copolymer of an alkyl (meth) acrylic ester wherein the alkyl group contains 1 to 3 carbon atoms;
   wherein the T Transmittance of the molded articles is 80.00 minimum.

7. The molded articles of claim 6 wherein the IDI is 50.0 Joules minimum and the MMP is 6.4 MPa maximum.

8. A thermoplastic molding composition comprising:
(a) from 95 to 70% by weight based on the total weight of (a) and (b) of a copolyester of a dicarboxylic acid moiety, at least 50 mole percent of which is terephthalic acid, and a dihydric alcohol moiety, at least 50 mole percent of which is ethylene glycol and 20 to 50 mole percent of which is diethylene glycol or 1,4-cyclohexanedimethanol, the copolyester having a glass transition temperature (Tg) of about 40° to 85° C. and an inherent viscosity (I.V.) of about 0.2 to 10; and
(b) from 5 to 30% by weight based on the total weight of (a) and (b) of a copolymer prepared utilizing 55 to 83% by weight based on the weight of the copolymer of a styrenic monomer; 35 to 15% by weight based on the weight of the copolymer of an unsaturated dicarboxylic acid anhydride; and 10 to 2% by weight based on the weight of the copolymer of an alkyl methacrylate wherein the alkyl group contains 1 to 3 carbon atoms.
wherein the % Transmittance of the molding composition is 80.00 minimum.

9. The molding composition of claim 8 wherein the IDI is 50.00 Joules minimum and the MMP is 6.4 MPa maximum.

10. The molding composition of claim 8 wherein the styrenic monomer is styrene.

11. The molding composition of claim 8 wherein the unsaturated dicarboxylic acid anhydride is maleic anhydride.

12. The molding composition of claim 8 wherein the alkyl methacrylate is methyl methacrylate.

13. Molded articles prepared from a thermoplastic molding composition comprising:
(a) from 95 to 70% by weight based on the total weight of (a) and (b) of a copolyester of a dicarboxylic acid moiety, at least 50 mole percent of which is terephthalic acid, and a dihydric alcohol moiety, at least 50 mole percent of which is ethylene glycol and 20 to 50 mole percent of which is diethylene glycol or 1,4-cyclohexanedimethanol, the copolyester having a glass transition temperature (Tg) of about 40° to 85° C. and an inherent viscosity (I.V.) of about 0.2 to 10; and
(b) from 5 to 30% by weight based on the total weight of (a) and (b) of a copolymer prepared utilizing 55 to 83% by weight based on the weight of the copolymer of a styrenic monomer; 35 to 15% by weight based on the weight of the copolymer of an unsaturated dicarboxylic acid anhydride; and 10 to 2% by weight based on the weight of the copolymer of an alkyl methacrylate wherein the alkyl group contains 1 to 3 carbon atoms;
wherein the % Transmittance of the molded articles is 80.00 minimum.

14. The molded articles of claim 13 wherein the IDI is 50.0 Joules minimum and the MMP is 6.4 MPa maximum.

* * * * *

UNITED STATES PATENT AND TRADEMARK OFFICE
CERTIFICATE OF CORRECTION

PATENT NO. : 4,985,501
DATED : JANUARY 15, 1991
INVENTOR(S) : UDIPI

It is certified that error appears in the above-identified patent and that said Letters Patent is hereby corrected as shown below:

Column 1, lines 23-24 of the Patent, change "acrylonitrile-acrylatestyrenic copolymer" to -- acrylonitrile-acrylate-styrenic copolymer --.

Column 2, line 2 of the Patent, change "by Weight" to --by weight--.

Column 3, line 19 of the Patent, change "flameretardants" to --flame retardants--.

In the Specification, Column 3, line 45 of the Patent, change "Lustran ®SAN" to --Lustran® SAN--.

In Claim 1, Column 5, line 67 of the Patent, change "diethylene glycol of 1,4-cyclohexanedimethanol" to --diethylene glycol or 1,4-cyclohexanedimethanol--.

In Claim 1, Column 6, line 17 of the Patent, change "55 17%" to --55 to 17%--.

In Claim 1, Column 6, line 24 of the Patent, change "T Transmittance" to --% Transmittance--.

In Claim 5, Column 6, line 35 of the Patent, change "alkyl acrylic ester" to --alkyl (meth)acrylic ester--.

UNITED STATES PATENT AND TRADEMARK OFFICE
CERTIFICATE OF CORRECTION

PATENT NO. : 4,985,501

DATED : January 15, 1991

INVENTOR(S) : Kishore Udipi

It is certified that error appears in the above-identified patent and that said Letters Patent is hereby corrected as shown below:

In Claim 6, Column 6, line 67 of the Patent, change "T Transmittance" to --% Transmittance--.

In Claim 9, Column 7, line 29 of the Patent, change "50.00 Joules" to --50.0 Joules--.

Signed and Sealed this

Twelfth Day of May, 1992

Attest:

DOUGLAS B. COMER

Attesting Officer

Acting Commissioner of Patents and Trademarks